No. 895,501. PATENTED AUG. 11, 1908.
W. G. SCHAEFFER.
YIELDABLE DRIVING GEAR.
APPLICATION FILED NOV. 6, 1907.

William G. Schaeffer,
Inventor

Witnesses

By

Attorney

UNITED STATES PATENT OFFICE.

WILLIAM G. SCHAEFFER, OF READING, PENNSYLVANIA, ASSIGNOR TO READING-STANDARD COMPANY, OF READING, PENNSYLVANIA, A CORPORATION OF PENNSYLVANIA.

YIELDABLE DRIVING-GEAR.

No. 895,501.  Specification of Letters Patent.  Patented Aug. 11, 1908.

Application filed November 6, 1907. Serial No. 401,017.

*To all whom it may concern:*

Be it known that I, WILLIAM G. SCHAEFFER, a citizen of the United States, and a resident of the city of Reading, in the county of Berks and State of Pennsylvania, have invented certain new and useful Improvements in Yieldable Driving-Gear, of which the following is a specification.

My invention relates particularly to that class of yieldable wheels in which the rim portion is joined to the inner portion by a friction connection adapted to permit slipping of one portion upon the other when subjected to excessive strain.

The novel features of construction are fully described in connection with the accompanying drawings and are specifically pointed out in the claims.

Figure 1:
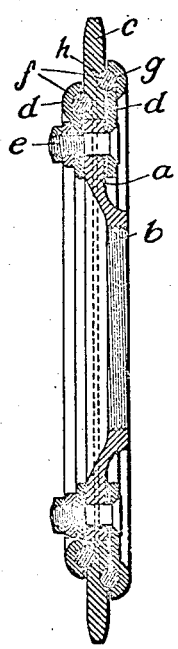
Figure 2:
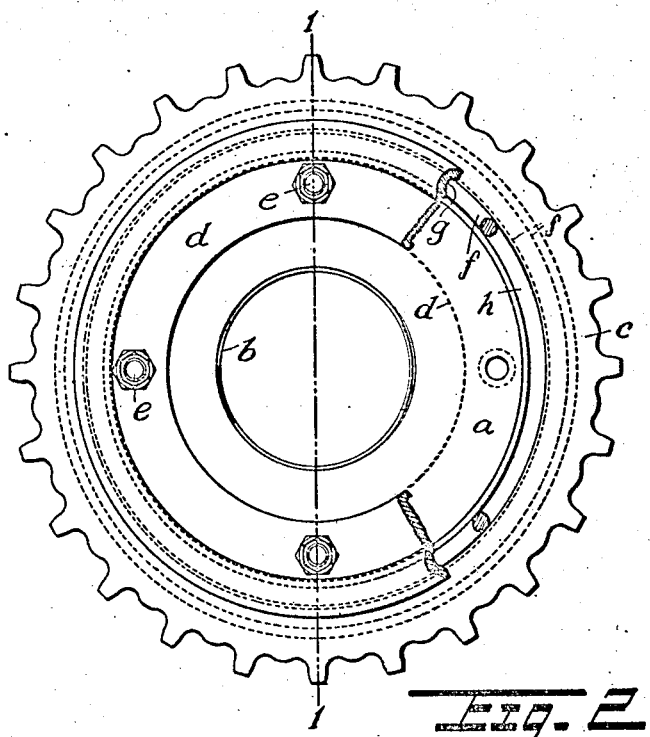
Figure 3:
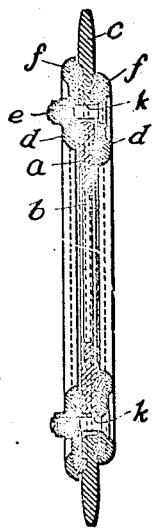

Figure 1 is a cross-sectional view of a sprocket wheel embodying my invention in preferred form, the section being taken on the line 1—1 of Fig. 2. Fig. 2 is a partial front elevation of the same. Fig. 3 is a similar view to Fig. 1 indicating a modified construction.

In the drawing $a$ represents an inner wheel section of circular form, provided as shown with a central screw-threaded opening $b$ for securing the same to a shaft; and $c$ represents the outer or rim section of the wheel which loosely encircles the inner section $a$. These two sections are yieldably connected by means of oppositely arranged clamping plates $d, d$, which cover the circular junction of the sections and are drawn together by transverse clamping bolts $e$, and interposed friction rings $f$ which are seated in opposed grooves $g$ and $h$ formed respectively in the inner face of the clamping plates and the outer face of the adjacent wheel section.

As shown in Fig. 1 the inner periphery of the rim section $c$ is rotatably fitted upon the outer periphery of the inner wheel section $a$, so as to be directly centered by the latter and to ride thereon when subjected to slipping strains in actual service; and the clamping plates $d, d$, are both rigidly connected to one of the wheel sections (the inner section $a$ as shown) by passing the clamping bolts $e$ through alined openings therefor formed in the plates and said wheel section at equal distances from the axis of the wheel, while the other wheel-section ($c$) is merely gripped between the overlapping portions of the clamping plates by the tightening up of the clamping screws, this gripping action being operative through the interposed friction rings $f$ bearing in the opposed plate and wheel-section grooves $g$ and $h$. These opposed circular grooves are preferably formed on the two sides of the wheel section, of different diameters, as shown, so that the thickness of said section need be no greater than for a single groove.

In my improved construction it will be noticed that the "web" of the wheel is formed partly on the rim section $c$ and partly on the inner section $a$, the circular junction between the sections being thus formed in the web plate and the junction covered by the overlapping annular clamping plates upon the opposite sides of the assembled sections. While I prefer that the outer section $c$ should be loosely fitted upon the inner section $a$ as stated so that their joined web portions form an apparently unbroken web as in Fig. 1, this construction may be modified, as indicated in Fig. 3 where a web space $k$ is left between the sections, through which space the clamping bolts are passed instead of through bolts holes in one of the sections; the outer or rim section being in this case held concentric with the inner section by the groove-engaged friction rings interposed between each wheel section and the clamping plates, and the slippage of one section relative to the other being free to occur upon either the outer or the inner wheel section.

What I claim is:—

1. A wheel comprising a circular inner section and a concentric rim section rotatably mounted upon the periphery of said inner section, oppositely arranged annular clamping plates covering the circular junction line of the two sections, and transverse clamping bolts whereby one of said sections is rigidly connected to said plates and the other section yieldingly clamped between the extending portions thereof substantially as set forth.

2. A wheel comprising a circular inner section and a concentric rim section rotatably mounted upon the periphery of said inner section, oppositely arranged annular clamping plates covering the circular junction line of the two sections, transverse clamping bolts rigidly connecting one of said sections to the plates, and friction rings seated in opposing grooves in the other section and in the plate portions overlapping the latter substantially as set forth.

3. A wheel comprising a circular inner section and a rim section loosely encircling it, said inner and rim sections being yieldingly connected by means of oppositely arranged clamping plates overlapping the sections, transverse clamping bolts for said plates, and interposed friction rings of different diameters seated in opposing grooves formed in said plates and in the opposite sides of one of said wheel-sections, substantially as set forth.

4. A wheel comprising a circular inner section and a rim section rotatably fitted thereon, said inner section and rim being yieldingly connected by means of oppositely arranged clamping plates overlapping the sections, transverse clamping bolts rigidly connecting said plates to one of said wheel sections, and interposed friction rings of different diameters seated in opposing grooves formed in said plates and in the opposite sides of the other wheel section substantially as set forth.

In testimony whereof, I affix my signature, in the presence of two witnesses.

WM. G. SCHAEFFER.

Witnesses:
D. M. STEWART,
W. G. STEWART.